United States Patent
Bauer et al.

(10) Patent No.: US 7,254,222 B1
(45) Date of Patent: Aug. 7, 2007

(54) METHOD AND APPARATUS FOR IMPLEMENTING A PRE-PAID CARD SERVICE

(76) Inventors: Thomas Michael Bauer, 8 Galaxy Ct., Belle Mead, NJ (US) 08502; Christopher P. Gilboy, 11 Paulette Dr., Freehold, NJ (US) 07728; Stephen Shinners, 106 N. Coachman Dr., Freehold, NJ (US) 07728

( * ) Notice: Subject to any disclaimer, the term of this patent is extended or adjusted under 35 U.S.C. 154(b) by 525 days.

(21) Appl. No.: 10/329,744

(22) Filed: Dec. 24, 2002

(51) Int. Cl.
*H04M 15/00* (2006.01)

(52) U.S. Cl. ............... 379/114.2; 379/114.28; 379/120; 379/127.01

(58) Field of Classification Search ........ 379/111, 379/114.01, 114.2, 121.01, 114.28, 120, 127.01
See application file for complete search history.

(56) References Cited

U.S. PATENT DOCUMENTS

| | | | | |
|---|---|---|---|---|
| 5,815,561 | A * | 9/1998 | Nguyen et al. | 379/115.01 |
| 6,188,752 | B1 * | 2/2001 | Lesley | 379/114.16 |
| 6,195,422 | B1 * | 2/2001 | Jones et al. | 379/127.05 |
| 6,337,903 | B1 * | 1/2002 | Manner | 379/144.01 |
| 6,377,938 | B1 * | 4/2002 | Block et al. | 705/32 |
| 6,434,378 | B1 * | 8/2002 | Fougnies | 455/406 |
| 6,785,372 | B1 * | 8/2004 | Moss et al. | 379/114.2 |
| 6,873,690 | B2 * | 3/2005 | Moon et al. | 379/114.2 |
| 2003/0043984 | A1 * | 3/2003 | Lauzon | 379/144.01 |
| 2005/0078808 | A1 * | 4/2005 | Winstead et al. | 379/114.2 |
| 2007/0036307 | A1 * | 2/2007 | Allen et al. | 379/114.2 |

OTHER PUBLICATIONS

Product Data Sheet, N-SOFT S.A, http://www.n-soft.com/downloads/PP3Datasheet01-0.pdf, no date provided.
Web Pages, TELECENTS Communications, http://telecents.com/, http://telecents.com/ourcards.htm, http://telecents.com/pinless.htm#, http://telecents.com/smartcents_spec.htm http://telecents.com/new_totalcents2.htm, no date provided.
Product Data Sheet, N-SOFT S.A, http://www.-soft.com/downloads/PP30Datasheet01-0.pdf, no date provided.
Web Pages, TELECENTS Communications, http://telecents.com/, http://telecents/ourcards.htm, http://telecents.com/pinless.htm#, http://telecents.com/smartcents_spec.htm http://telecents.com/new_totalcents2.htm, no date provided.

* cited by examiner

*Primary Examiner*—Binh K. Tieu
(74) *Attorney, Agent, or Firm*—Ronald D. Slusky

(57) ABSTRACT

A pre-paid telecommunications card service in which the card-holder can register the card with a service provider in such a way that the card account becomes associated with the customer's home telephone line. Thereafter, toll calls made over that particular telephone line are automatically charged to the pre-paid card account when a destination telephone number is dialed. The card-holder is therefore freed from having to dial an access number or a card number for each call. The call accounting is carried out in a database with which network switches communicate via SS7 or any other desired data messaging protocol.

26 Claims, 3 Drawing Sheets

| RECORD NUMBER | ACCESS TELEPHONE NUMBER | ACCOUNT NUMBER | ACCOUNT BALANCE | HOME TELEPHONE NUMBER | OTHER TELEPHONE NUMBERS | PIN | PIN FLAG | REMOTE ISSUER |
|---|---|---|---|---|---|---|---|---|
| 00001 | 800-555-4321 | 477455644 | $13.86 | 732-555-8974 | NONE | 5113 | YES | ---- |
| 00002 | 800-555-1234 | 453244904 | $50.94 | 908-532-1212 | 908-555-9084 | 0050 | NO | ---- |
| 00003 | 888-555-5678 | 753184753 | $25.00 | UNASSIGNED | UNASSIGNED | UNASSIGNED | | ---- |
| 00004 | 887-555-2222 | 664533421 | $15.00 | UNASSIGNED | UNASSIGNED | UNASSIGNED | | ---- |
| 00005 | 887-976-1212 | 936593763 | ---- | ---- | ---- | ---- | ---- | ABC |
| ... | ... | ... | ... | ... | ... | ... | ... | ... |

FIG. 4

METHOD AND APPARATUS FOR IMPLEMENTING A PRE-PAID CARD SERVICE

BACKGROUND OF THE INVENTION

The present invention relates to prepaid telecommunication card services.

Pre-paid cards are a convenient way for telephone customers to make and pay for telephone toll calls. These cards, which are typically purchased at retail outlets, are available in various denominations corresponding to a certain amount of telephone service—typically some number of flat-rate minutes. In a typical use of a pre-paid card, the card-holder follows as three-stage dialing sequence comprising a) dialing an access number specific to the prepaid service offer that directs the call to the prepaid service provider's platform, such as a local access number or a so-called 8YY toll-free telephone number, meaning a ten-digit number beginning with, for example, 800, 888 or 887, b) then dialing a number (also called the account or PIN number) identifying the individual pre-paid card, and c) then dialing the destination telephone number of the party that the prepaid card holder wants to reach. The prepaid service telephone system maintains an account for each card in a database. The initial monetary balance in the account is the face value of the card. As calls are made using the card, the cost of the calls is automatically subtracted from the account balance. The card remains good for additional calls as long as the account has a non-zero balance.

Entering all of the information noted above is somewhat cumbersome for the card-holder but essentially unavoidable in the public telephone context and has been this way for card services since competitive services were first offered. Arrangements are known, however, that allow for a more convenient use of pre-paid cards for calls over private—typically home—telephone lines. Once having purchased the card, the customer can register or configure it with his service provider so that the card account becomes associated with the customer's home telephone line. Thereafter, toll calls made over that particular telephone line are automatically charged to the pre-paid card account when a destination telephone number is dialed. The card-holder is therefore freed from having to dial an access number and then a card number for each call. Such arrangements are referred to herein as "one-step" systems since only the single step of dialing the destination telephone number is required, as compared to the three-step approach previously mentioned.

SUMMARY OF THE INVENTION

In all of the one-step systems of which the present inventors are aware, when a call is received by the local switch from a telephone line for which a pre-paid card has been registered, the call is transferred or forwarded to a specialized platform that is typically accessed via an intervening carrier network. This platform carries out the requisite call charge accounting and then originates another call leg back through a carrier network switch for routing to the ultimate destination.

There are a number of drawbacks to this prior art approach. For example, it requires each call to pass through the prepaid platform twice—once on the way to the platform from the originating LEC and transport carrier network and once on the way from the platform to the destination via a transport carrier network. Such a platform arrangement of bridging these two calls, referred to as "hair-pinning," represents an inefficient use of both the prepaid platform's and the telephone network's infrastructure. In addition, it is difficult, if not totally impractical, to interwork the provision of one-step pre-paid card calling with other, enhanced telephone services, such as Caller ID.

The present invention overcomes the above shortcomings. In accordance with the invention, the call accounting is carried out in a database that communicates with other network elements, such as switches, via the SS7, or some other messaging/signaling network, thus utilizing messages conforming to the protocol appropriate to that network, such as the SS7 protocol. The call itself, however, is switched and routed just like calls that are billed on a non-pre-paid basis. Advantageously, then, the invention eliminates hair-pinning and also allows a call that is made using one-step pre-paid billing to be availed of the full spectrum of enhanced telephone services.

DETAILED DESCRIPTION OF AN ILLUSTRATIVE EMBODIMENT

Figure 1:
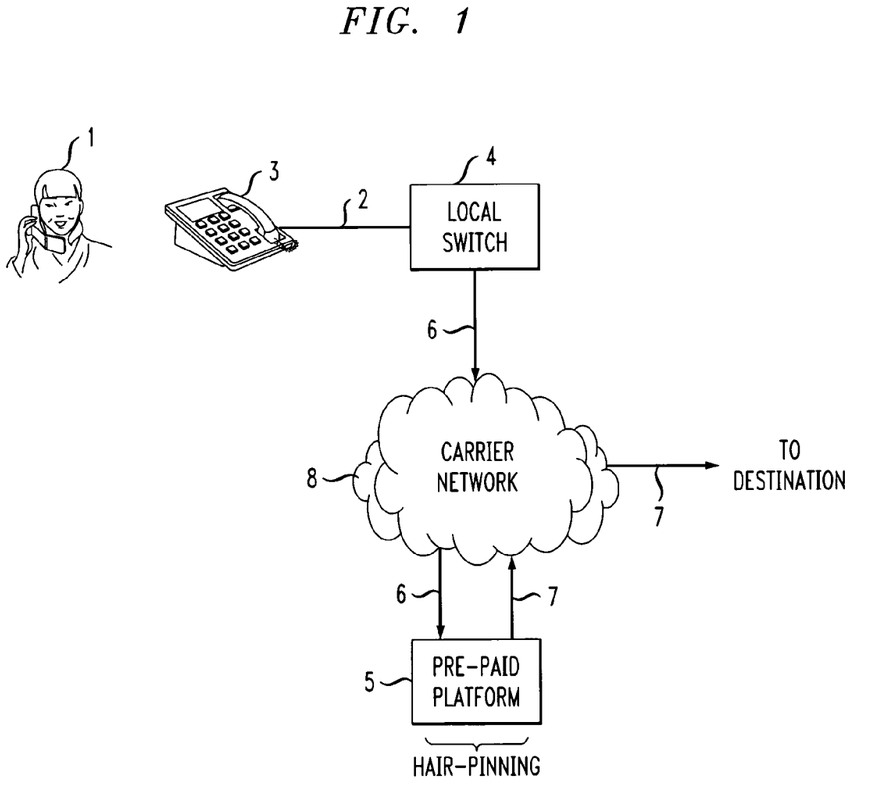
FIG. 1 is a block diagram of a one-step pre-paid card arrangement as implemented in the prior art.

FIG. 1 shows a prior art approach to providing one-step pre-paid card dialing. A subscriber 1 having a telephone set 3 makes a call over his local telephone line 2 to a local switch 4. The switch transfers the call over connection 6 to platform 5. The latter undertakes the steps necessary to charge the cost of the call to the pre-paid card that was previously registered, and then originates another call back through a carrier network 8 over connection 7, whereupon the carrier network routes the call to its final destination over the telephone network. A network or series of networks may exist between the local switch and the platform and the prepaid platform and the destination number. This approach is disadvantageous for at least the reasons set forth hereinabove. Those skilled in the art will appreciate that this same architecture applies to a local exchange carrier's network and to local toll calls, where the local carrier is also the presubscribed interexchange carrier for the telephone line. In this instance, the local switch 4 could also perform the functions described in FIG. 2 for the interexchange carrier.

Figure 2:
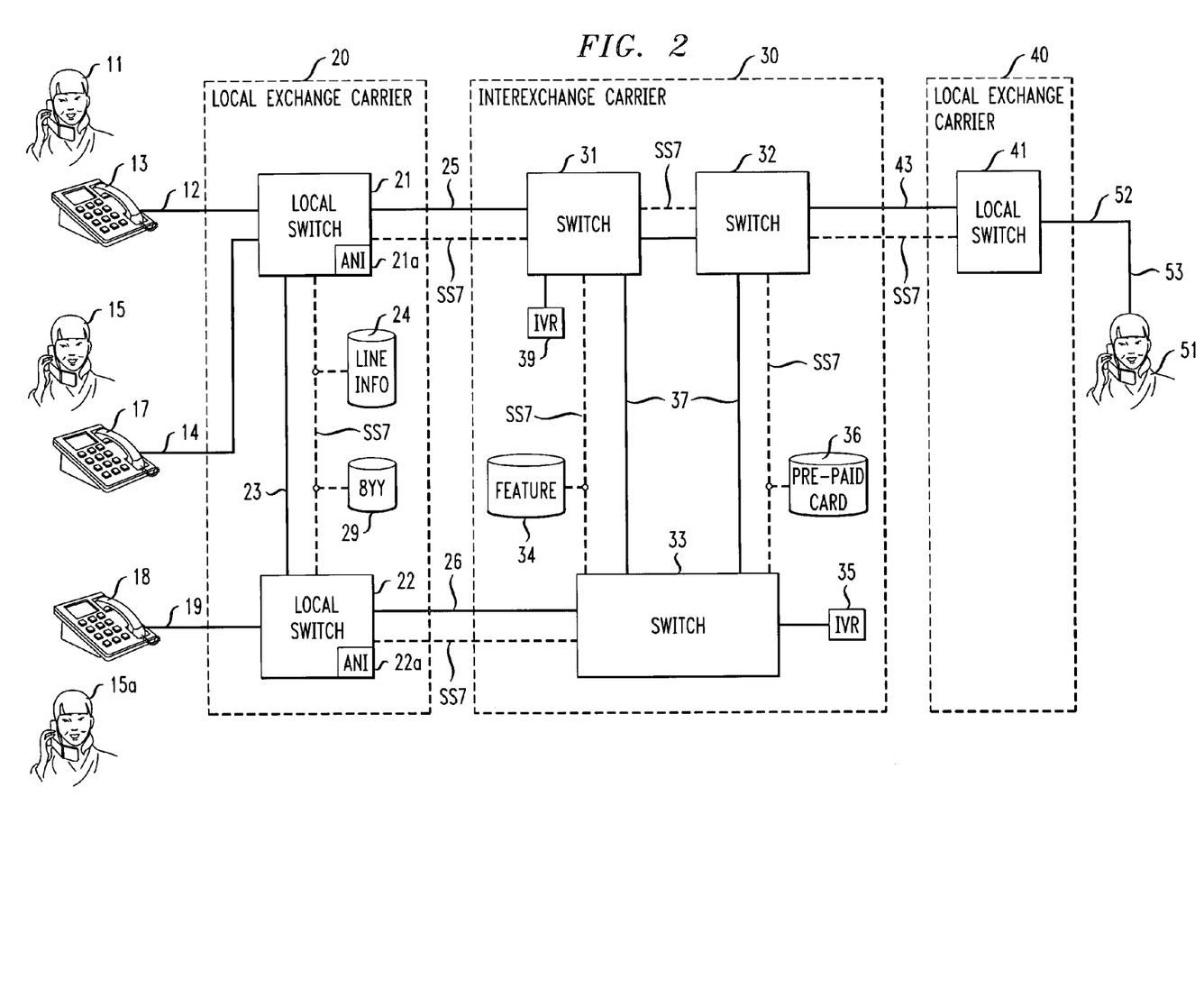
FIG. 2 is a block diagram of an illustrative telecommunications system in which the present invention is implemented.

FIG. 2 shows a telecommunications system, or network, in which the present invention is illustratively implemented. The system includes local exchange carriers 20 and 40 and interexchange carrier 30. Only certain portions of the carriers' network equipment necessary to describe the invention—notably various switches and database systems (referred to herein as "databases")—are shown.

Local exchange carrier 20 includes local switches 21 and 22 interconnected by trunk 23, line information database 24 and 8YY database 29. Local exchange carrier 40 includes local switch 41. Interexchange carrier 30 includes switches 31, 32 and 33 which are connected to local switches 21, 22 and 41 via trunks 25, 26 and 43, respectively. Switches 31, 32 and 33 are themselves interconnected by various trunks 37. Interexchange carrier 30 also includes feature database 34, and pre-paid card database 36.

Each of the aforementioned pieces of network equipment, particularly the switches and databases, is connected to an SS7 signaling network. As is well known in the art, such a network is distinct from the so-called transport network, i.e., the switches and trunks that carry the subscribers' voice or data just described. An SS7 network includes so-called signal transfer points (STPs) that route messages among the various entities that are connected to the SS7 signaling network. These messages conform to an SS7 protocol standard that defines the procedures and protocol by which network elements exchange information to effect call setup, routing and control. For drawing clarity and simplicity, the STPs of the SS7 signaling network are not explicitly shown in the FIG. 2. Rather, dashed lines labeled "SS7" each representing a path, or route, through the SS7 network are shown connecting various ones of the network elements that exchange SS7 messages in order to carry out the call processing and billing processing described herein. It will be appreciated that the actual routes for SS7 messages are through the SS7's STPs even though those routes are shown for simplicity in the drawing as direct connections. The assemblage of the dashed lines is intended herein to represent the overall SS7 network.

We consider, first, a typical long-distance calling scenario not involving the present invention. An originating subscriber 11 has a telephone set 13 connected to local switch 21 via telephone line, or local loop, 12. Subscriber wishes to make a telephone call to a destination subscriber 51, who has a telephone set 53 connected to local switch 41 via telephone line 52. Subscriber 11 initiates a request for the call to be set up by taking telephone set 13 off hook and dialing the destination telephone number, namely the number associated with telephone line 52. Upon determining that the call is a long-distance call requiring the services of an interexchange carrier, local switch 21 accesses line information database 24 to determine the calling customer's preferred interexchange carrier. In this case it is interexchange carrier 30. The call request, which includes, for example, the originating and destination telephone numbers, is therefore forwarded to switch 31. Through an exchange of SS7 messages among the appropriate switches and various other network elements, the call is ultimately set up and routed over a connection from telephone set 11 through switches 21, 31, 32 and 41 to telephone set 51. In the course of that call-setup, switch 31 will have exchanged various SS7 messages with feature database 34 to determine if the subscriber has previously subscribed to any telephony features that should be provided to this call, such as a pre-call announcement. As the so-called ingress switch for this call, switch 31 also keeps a record of the details of the call, including its duration, and when the parties hang up, switch 31 generates a so-called AMA billing record that gets transmitted to a billing system (not shown) for later use in rendering the monthly long-distance telephone bill for subscriber 11.

Figure 3:
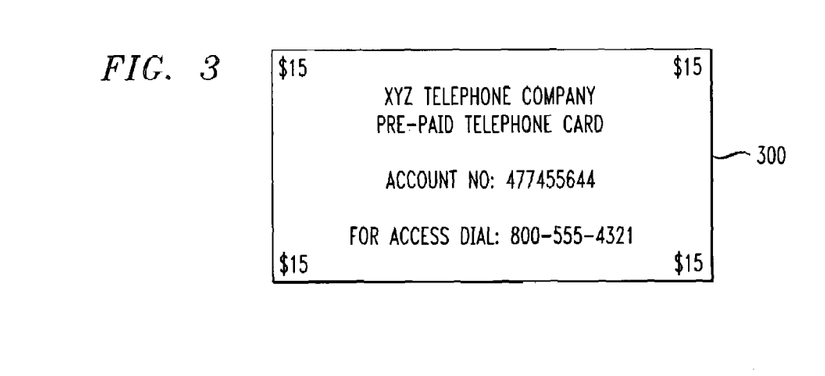
FIG. 3 shows a pre-paid card illustratively used in implementing pre-paid card service pursuant to the principles of the invention.
Figure 4:
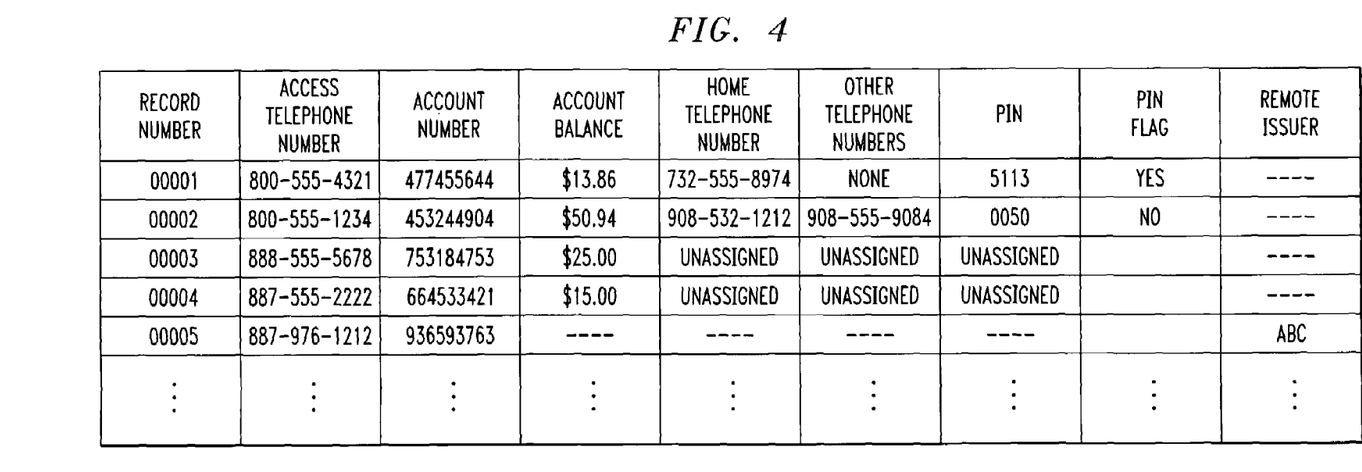
FIG. 4 shows records in a pre-paid card database contained with the system of FIG. 2 and used in implementing the invention.

Turning now to the invention, a second subscriber 15 has an associated telephone set 17 connected to local switch 21 via telephone line 14. Subscriber 15 has purchased pre-paid card 300 depicted in FIG. 3. Subscriber 15 is also referred to as various points in this description as the card holder. The card was issued by interexchange carrier 30 and was purchased by subscriber 15 at, for example, a retail outlet. In accordance with the invention, subscriber 15 has already registered his card with interexchange carrier 30 and the latter has made an appropriate entry in pre-paid card database 36. The manner in which the registration was effected is discussed below. For the present it suffices to note that pre-paid card database 36 includes a database record stored for each of a number of pre-paid card accounts, as shown in FIG. 4. The database record for a card is created and stored in a memory within the database no later than when it is sent to a vendor or otherwise made available for distribution to the public.

The record for pre-paid card 300 is illustratively record 00001 shown in FIG. 4. Within this record, account number, 477455644, in the Account Number field is a number uniquely associated with pre-paid card 300 and is, in fact, printed on the card. The monetary balance in the account, $13.86, in the Account Balance field is the present value remaining on card 300 which was illustratively a $15.00 card against which were charged telephone calls whose toll charges to this point totaled $1.14.

The home telephone number, 732-555-8974, in the Home Telephone Number field is the telephone number assigned to subscriber 15's home telephone line 14. In actuality, the telephone number registered in the account record does not have to be the telephone number assigned to card-holder's home telephone line. It could be some other residence line or a business telephone line chosen by the card-holder. It is envisioned, however, that the home telephone number will be the telephone number that the card holder will most often wish to register and hence this field will be referred to herein as the Home Telephone Number field.

Subscriber 15 also wishes to call subscriber 51. As before, when switch 21 receives a call request containing the destination telephone number, i.e., the telephone number assigned to subscriber 51's telephone line, local switch 21 determines subscriber 15's preferred interexchange carrier from database 24. In this case it is, again, illustratively interexchange carrier 30. As noted below, for card-holders that have pre-subscribed to the interexchange carrier as their local toll carrier provider this same 1-stage prepaid dialing capability can also be applied to local toll calls. In the course of call set-up, switch 31 determines from feature database 34 that subscriber 15 is a pre-paid card subscriber, meaning that subscriber 15 has previously registered his pre-paid card with interexchange carrier 30. Switch 31 thereupon communicates with pre-paid card database 36 in an SS7 message that indicates that a call is being set up and includes in that message the originating telephone number assigned to subscriber 15's telephone line 14 and the destination telephone number, all of which had been supplied to switch 31 in an SS7 message from switch 21. Subscriber 15 did not have to enter the digits of his own telephone number 732-555-8974 when placing the call to subscriber 51. Rather, the number was automatically ascertained by Automatic Number Identification (ANI) equipment 21a within switch 21 and thus ascertained independent of any input made via terminal equipment, e.g., telephone set 17, connected to the line. It may be noted that the term Automatic Number Identification (ANI) is often called by other terms, for instance the Calling Party Number, or the Billing Number. There are in fact instances where the ANI is different than the Calling Party Number or Billing Number, for example when five line numbers are all associated with one Billing Number for a business.

In any event, pre-paid card database 36 utilizes the originating telephone number to find the record associated with the account for card 300, i.e., the card having account number 477455644 and listed in record 00001. Based on the originating and destination telephone numbers and the remaining balance in the account, pre-paid card database 36 computes or otherwise determines an allowed duration for the call, i.e., how many minutes of call time would use up the remaining credit in the account. (Note that even though a flat per-minute rates are charged, the rate is typically different for domestic and non-domestic calls.) Other implementation methods or approaches for controlling the allowed time of the call within the network described herein are known to those skilled in the art. Pre-paid card database 36 supplies the allowed call duration in an SS7 message sent to switch 31. Switch 31 thereupon allows call set-up to proceed in essentially the same manner as the call from subscriber 11 was set up. Switch 31 also starts a timer associated with this call and would provide any other prepaid service functions and treatments that would apply to a prepaid call, such as an announcement via IVR 39 that indicates to the calling party how much time and/or balance is available for the call on their account.

Advantageously, then, the caller was able to make a call to be charged against a pre-paid card account in a one-step process, that is, by having dialed only the destination telephone number.

At some subsequent time the call terminates. This typically happens in one of two ways. The parties may complete their call before the timer has expired. An exchange of SS7 messages causes the call to be torn down. In addition, switch 31 sends an SS7 message to pre-paid card database 36 indicating what the actual duration of the call was. Pre-paid card database 36 thereupon updates the balance in the account in an amount determined as a function of that call duration. Switch 31 may also generate an AMA record for the call but the AMA record will contain information indicating that the call has already been paid for so that no end-of-the-month billing for this call will be made.

The other way in which the call may typically terminate is if the call timer times out while the call is ongoing. However, just prior to (e.g., one minute before) the timer expiring, switch 31 connects an interactive voice response (IVR) system 39 to the call and causes it to deliver a message to the calling party, indicating that the call is about to terminate. The card-holder/caller is thereupon given the opportunity to make payment arrangements to allow the call to continue, such as by supplying to the IVR system a credit card number against which the cost for the balance of the call will be charged or other payment options or methodology that are known to those skilled in the art. Assuming that the subscriber elects that option, a check is made to ensure that the credit card number is valid and the call is then allowed to continue until the parties hang up. A charge for the balance of the call not covered by the pre-paid card account is thereupon sent to the subscriber's credit card company. Either at the time of timer expiration or at the end of the call, switch 31 reports to pre-paid card database 36 the duration of the call which, in this case, will cause pre-paid card database 36 to reduce the balance in the pre-paid card account to zero.

A different option provided to the card holder/caller at this time is to replenish the pre-paid card account. This could be done by the card-holder supplying to the IVR system his credit card number and indicating the desired replenishment amount. One variant of this option includes an automatic balance recharge function registered to the account by the card holder to replenish the account via a commercial credit card account number stored in database 36. This credit card account number is used whenever the account balance goes below a set threshold. This function is performed independent of, and autonomously from, the call within the telephone network. Alternatively, the subscriber is given the option of supplying the account number of a different pre-paid card and may indicate through the IVR system that he desires to transfer all or some portion of the value of that second card to the first card's account. (The user may wish to continue to use the first card for any of a number of record-keeping reasons or for convenience because he has memorized the card number and uses it when making public telephone calls, as described below.) Once the call terminates, switch 31 again sends an SS7 message to pre-paid card database 36 indicating the call duration, and the database updates the account balance. Of course, if the subscriber had used a second pre-paid card to replenish the first, the amount of the second card's value that was transferred to the first card's account will have been deducted from the balance maintained in the database record for that second card account.

If the subscriber does not choose any of the payment options offered, switch 31 causes the call to be terminated when the timer actually expires. As before, the call duration is reported by switch 31 back to pre-paid card database 36. This will reduce the balance in the account to zero once pre-paid card database 36 updates it based on the reported call duration, precluding any further use of the card unless and until the account is replenished, e.g., during an administrative session as described below.

Advantageously, a prepaid card account can be used not only for one-step pre-paid calls from the registered telephone number as just described but can also be used to make, for example, three-step calls from other telephones as well. A member of subscriber 15's family, subscriber 15a, for example, may initiate a call from public telephone 18 which is connected to local switch 22 via telephone line 19. Instructions printed on card 300 indicate that to use the card from a non-registered telephone line, the card-holder should dial an access number, illustratively 800-555-4321.

Local switch 22, upon recognizing from the prefix 800 that a toll-free access number was dialed, consults 8YY database 29 to determine which telecommunications carrier services that particular toll-free number. Upon determining that it is interexchange carrier 30, local switch 22 forwards the call to switch 33, supplying via appropriate SS7 messaging at least both the dialed access telephone number 800-555-4321 and the telephone number associated with the originating telephone line, as determined by ANI equipment 22a. Program logic within switch 33 causes allows the switch to recognize the dialed telephone number 800-555-4321 as being associated with interexchange carrier 30's pre-paid card service. Accordingly, switch 33 connects to the call an interactive voice response (IVR) system 35 that prompts the caller to supply the account number printed on the card or, if he has registered the card, his home telephone number. Switch 33 then supplies that number to pre-paid card database 36, along with the dialed 8YY access number. Pre-paid card database 36 identifies the account in record 00001 as being a valid account associated with the number that was supplied and also, for security reasons discussed below, associated with the dialed 8YY access telephone number. If the database record for the card shows that no telephone line was registered in association with this card, the system must take into account the possibility that this call is being made not to place a call but, in fact to register the card-holder's home (or other) telephone line in association with the card. That scenario is discussed hereinbelow.

Assuming, instead, that the card was previously registered, pre-paid card database 36 immediately proceeds to instruct switch 33 to collect the digits of the destination telephone number. Switch 33 supplies the collected destination telephone number to pre-paid card database 36, along with other pertinent information such as the fact that this is a public telephone call. The latter information is necessary because certain additional charges and/or a different per-minute rate may be charged for such calls. (Switch 33 is able to determine from signaling information delivered by switch 22 to switch 33 (known as Originating Line Information or as ANI-II digits) or from a database (not shown) maintained by local exchange carrier 20 or a "database service provider" contracted to support this data that the call is being made from a public telephone.)

The call and it's billing then proceed as previous described.

A substantially similar scenario applies if the card-holder dials the 8YY access code from a private, rather than a public, telephone line.

Allowing the subscriber to specify the home telephone number rather than the pre-paid card account number when placing calls over a non-registered telephone line, such as a public telephone, using the access number, is a convenience to the subscriber. The subscriber already knows his home telephone number and thus does not have to bother with finding the pre-paid card in his wallet and reading off the numbers. A security issue that arises in this scenario, however, is that if some third party should learn that the subscriber has registered a pre-paid card in association with the subscriber's home telephone number that third party could then charge calls against the card simply by knowing, or finding out, the subscriber's telephone number. This fraudulent situation can be protected against in at least two ways. Firstly, the subscriber can be offered the opportunity to define a personal identification number (PIN) when the card is first registered for one-step use, and can be given further option of instructing the system that it should prompt callers for that PIN whenever the card is used from a telephone line other than one for which it was registered. For example, record 00001 has the PIN "5113" entered in its PIN field and a "yes" entered in its PIN Flag field, indicating that that PIN should, in fact, be prompted for on every call. The card holder for the card associated with record 00002 has also supplied a PIN but, at present, does not want to be prompted for it.

As another security measure, interexchange carrier 30 may establish a number of different access telephone numbers for use with its pre-paid cards, with the card itself indicating which one of those access numbers should be used, as shown in FIG. 3. It was noted earlier that when the public telephone call was being set up, switch 33 supplied pre-paid card database 36 with the 8YY number that was dialed by the caller. Pre-paid card database 36 will authorize the call to proceed only if the access number that was dialed was the correct one, as indicated in the corresponding database records. FIG. 4 shows how various different accounts have different associated 8YY access numbers, as listed in the 8YY Access Telephone Number field. If more than, say, two attempts to use a card are made using different access numbers in an attempt to work around this security measure, pre-paid card database 36 can "lock up" the card, preventing any further use until the subscriber calls in to the system using the correct access number and supplies the aforementioned PIN during a card administration session, as described below.

In order to allow for more than one call at a time to be charged to a given pre-paid card, the system must be configured in such a way as to ensure that the total charges for all of the calls does not exceed the balance on the card. In particular, if the only accounting that is done is applied at call set-up and call termination, each call could potentially be of a duration that would, by itself, use up the full balance. Accommodation of concurrent calls charged to the same pre-paid account could be accomplished in any of a number of ways that could be devised by those skilled in the art involving, for example, ongoing communications among pre-paid card database 36 and the various switches responsible for timing the calls rather than just having those communications occur at call inception and termination. Absent such an arrangement, however, it is envisioned that pre-paid card database 36 would keep track of when a call is in progress and would notify a switch handling a second call to deny use of the pre-paid card at that time.

The manner in which the database record for a card gets created and populated will now be described. As previously noted, pre-paid card database 36 will already have stored within it the account numbers of all cards that have been manufactured and sent to vendors for sale to the public. Associated with each account number is a corresponding toll-free access number listed in the 8YY Access Telephone Number field. Thus it can be seen in FIG. 4 that the card bearing account number 753184753 in record 00003 is associated with access number 888-555-5678. No home telephone number has been assigned, and the full $25.00 value of this particular card is still available to the card holder.

In this example, subscriber 11 has now decided to avail himself of interexchange carrier 30's one-step pre-paid service and has purchased the card (not shown) associated with database record 00003. As instructed on the card, subscriber 11 dials the access number indicated on the card from his home phone. Switch 21 recognizes from the 888 prefix that this is a toll-free number and accesses 8YY database 29 to ascertain which carrier services that number. Upon learning that it is interexchange carrier 30, switch 21 passes the call request to switch 31, supplying via appropriate SS7 messaging at least both the dialed access telephone number 800-555-5678 and the telephone number associated with the originating telephone line, as determined by ANI equipment 21a. Program logic within switch 31 allows the switch to recognize the dialed telephone number 888-555-5678 as being associated with interexchange carrier 30's pre-paid card service. Accordingly, switch 31 connects interactive voice response (IVR) system to the call 39, the IVR system prompting the caller to supply the account number printed on the card or, if he has registered the card, his home telephone number. In this case, the caller supplies his card number since he hasn't registered any telephone number in association with the card. Switch 33 thereupon supplies the card number to pre-paid card database 36, along with the dialed 8YY access number. Pre-paid card database 36 identifies the account in record 00003 as being a valid account associated with the supplied account number and the dialed 8YY access telephone number. Since the database record for the card shows that no telephone line was previously registered in association with this card, the system must take into account the possibility that this call is being made not to place a call but, in fact to register the card-holder's home (or other) telephone line in association with the card.

Through a sequence of SS7 messages between pre-paid card database 36 and switch 31, the card-holder is thereupon prompted to indicate whether he wishes to register one or more telephone lines in association with the card, or just wishes to place a call and charge it to the card. If the latter, the call processing proceeds as described above in the public telephone scenario.

However, if the card-holder does wish to register one or more telephone lines, he is prompted to indicate if he wishes it to be the number he is calling from—this option is not offered if the call is made from a public telephone—and/or if he wishes to register any other telephone lines in association with this card. For example, the card-holder may be calling from home, and indeed, wishes to register the home number. This can be accomplished automatically, without the caller having to input the digits of the phone number since this is determined automatically by ANI equipment 21*a*. Or the card-holder may be calling from elsewhere but still wishes the card to be associated with some his home number. Or he may wish to register the telephone number in his daughter's college dormitory room so that she can make calls that will be charged against his pre-paid card account.

Each telephone number so indicated is stored in record 00003 in the Home Telephone Number field and/or the Other Telephone Numbers field. Thereafter, whenever a direct-dialed call handled by interexchange carrier 30 is made from any of the telephone numbers registered in association with a given pre-paid card account, the cost of the call will be automatically charged to that account without anything more than the destination telephone number having been supplied by the caller.

At some point during the course of any session during which the card-holder access of the system using the toll-free access number, he may be instructed to press a particular numeral or symbol on the dialing pad in order to reach a menu of administrative options. That menu can enable the card-holder to, for example, add or delete registered telephone numbers; replenish the account using his credit card or another pre-paid card; change his PIN or the aforementioned PIN flag; or perform other administrative actions. Registered telephone numbers do not have to have interexchange carrier 30 as the preferred interexchange carrier. For example, if the subscriber's daughter's telephone line at college has a different preferred interexchange carrier, the daughter would simply have to be sure that interexchange carrier 30 carried the call by dialing interexchange carrier 30's so-called dial-around code, which is 1010288 in the case of AT&T. An alternative to using the dial-around code when the telephone is not presubscribed to the same interexchange carrier as her home telephone is presubscribed to would be to use a two-stage dialing method of dialing the 8YY number and then the destination number, where the dormitory telephone's ANI is used to recognize the registered prepaid card account. The difference between the dial-around code and the 8YY number is simply a preference of the user.

If desired, a carrier providing pre-paid card service could allow calls handled by other carriers be charged against the pre-paid cards, presumably in exchange for a fee paid by the other carrier to the card service provider. For example, interexchange carrier 30 of the illustrative embodiment could allow intra-lata toll calls carried by the local exchange carriers to be charged against interexchange carrier 30's cards. This would involve providing the local exchange carriers with access to pre-paid card database 36.

Although prepaid card database 36 is depicted as a system that is part of interexchange carrier 30's network, to anyone skilled in the art, the actual prepaid card account information could be in a prepaid card database that is external to the interexchange carrier 30's network or that is accessed indirectly via the interexchange carriers' prepaid card database 36. Thus allowing the interexchange carrier to use/honor prepaid card accounts sold/distributed by other prepaid entities that have a business relationship with the interexchange carrier 30.

Thus a prepaid card system embodying the principles of the invention could be offered by a party that is not a telephone carrier. For example, company ABC that is simply in the business of marketing the prepaid cards could enter into a business relationship with interexchange carrier 30. Company ABC would have its own prepaid card database but would inform interexchange carrier 30 of the account numbers, which would be entered into pre-paid card database 36 and identified as being cards issued by company ABC. Record 00005 in FIG. 4 is a record for such a card, as identified by "ABC" in its "Remote Issuer" field. Card registration would be handled by interexchange carrier 30 in substantially the same manner as that described herein. When a call is made, however, pre-paid card database 36, upon recognizing the call as one that is to be charged to a card issued by company ABC would act as a conduit for SS7 messages between interexchange carrier 30's switches and company ABC's database. The latter could then interact with interexchange carrier 30's switches in the same way that manner that pre-paid card database 36 does for calls charged against interexchange carrier 30's cards.

The foregoing is merely illustrative and various modifications and variations are possible.

For example, although the invention is disclosed herein in the context of a system in which the local exchange carrier and interexchange carriers are different entities, they can, in fact, be one and the same. In the case where the interexchange carrier is the provider of so-called intra-lata toll service and/or provides a particular subscriber with local service via the local exchange carrier's switch, then upon identifying an incoming call as being from a such a subscriber (either from information stored in the local switch or the line information database), the local exchange carrier's switch hands off all billable calls to the interexchange carrier's switch. The interexchange carrier can thereupon provide pre-paid card service.

In the illustrative embodiment, card registration and administration is carried out by subscriber interaction with interactive voice systems using telephone connections. All of these functions could, however, be carried out in other ways, such as at a web site or even with a live operator.

Although the invention as disclosed herein utilizes special access numbers for calls from non-registered telephone numbers, such as public phones, this is not necessary. Rather, card-holders could be instructed to use their pre-paid cards for such calls using the same access mechanisms that are used for (credit-based) telephone calling cards such as AT&T's 1-800-CALLATT (1-800-225-5288).

The signaling network in the illustrative embodiment is an SS7 signaling network. SS7 is, indeed, a world-wide standard for telecommunications messaging. However, the invention is implementable in systems that use any signaling network that supports messaging among various types network elements, such as switches and databases.

In the disclosed embodiment, the pre-paid card database computes an allowed call duration and supplies that piece of information to a switch. In other embodiments, other kinds of information could be supplied by the database, e.g., the account balance, and the switch could be charged with the responsibility of determining when that balance is about to be depleted and/or for generating the updated balance amount, which would then be reported back to the pre-paid card database.

Although the present discussion talks in terms of a pre-paid cards, the creation, use and sale of physical cards is not actually required. Rather pre-paid accounts can be established in any convenient way, e.g., via web access, without issuing physical cards. Moreover, although the sale of pre-paid cards is described herein as being carried out at retail establishments, this is only illustrative. The cards could be sold by mail order and/or at web sites and could be offered not only by parties acting as re-sellers of carrier's cards, but by carriers themselves.

The invention could be used not only for voice calls but for data calls and not only over the traditional TDM transport network, but over ATM or other packet networks as well.

It will thus be appreciated that the foregoing merely describes various illustrative embodiments of the invention. Those skilled in the art will be able to devise numerous alternative arrangements which, although not explicitly shown or described herein, embody the principles of the invention and are thus with its spirit and scope.

The invention claimed is:

1. A method of a type in which the costs of telecommunications calls are billed to pre-paid accounts, said method being performed by equipment within a telecommunications network and comprising routing an individual one of said calls to a destination telephone number through said network without hair pinning said call through any pre-paid card equipment, and performing billing for said individual one of said calls to the destination telephone number utilizing messages sent to and received from a database that contains information about a pre-paid account associated with a telecommunications line from which said call was originated, said messages being communicated over a telecommunications signaling network that is distinct from the network on which said call is carried, at least one of said messages being a message to said database including an identification of said telecommunications line, wherein the destination telephone number was dialed by a caller without the caller having been prompted for the destination telephone number and without the caller having first dialed an access telephone number associated with calls that are to be charged to pre-paid accounts.

2. The invention of claim 1 wherein said identification of said telecommunications line was made by said equipment independent of caller input.

3. The invention of claim 1 wherein said messages sent to and received from said database are sent from and received by a telecommunications switch through which said call is routed.

4. The invention of claim 1 wherein said signaling network is an SS7 network and said messages conform to the SS7 protocol.

5. The invention of claim 1 wherein said identification of said telecommunications line is made by automatic number identification equipment within a telecommunications switch to which said telecommunications line is connected.

6. The invention of claim 1 wherein at least one of said messages includes information specifying an allowed duration for said call.

7. The invention of claim 1 wherein at least one of said messages is a message, from said database, from which an allowed duration for said call can be determined.

8. The invention of claim 7 wherein said at least one of said messages is sent to a telecommunications switch through which said call is routed.

9. The invention of claim 7 wherein said allowed duration for said call is computed by said database based on at least the monetary balance in said pre-paid account.

10. The invention of claim 9 wherein at least another one of said signaling messages is a message sent to said database indicating the actual duration of said call and wherein said database updates the monetary balance in said pre-paid account based on said actual duration.

11. The invention of claim 10 wherein said messages sent to and received from said database are sent from and received by a telecommunications switch through which said call is routed.

12. The invention of claim 1 further comprising billing to said pre-paid account the cost for a second call that originated from a second telecommunications line, the billing for said second call being carried out in response to information identifying said pre-paid account that was input through terminal equipment connected to said second telecommunications line.

13. The invention of claim 12 wherein said terminal equipment connected to said second telecommunications line is a public telephone.

14. The invention of claim 1 wherein at least a portion of said information about said pre-paid account was placed in said database in response to information, provided by a holder of a pre-paid card, identifying said card and identifying said associated telecommunications line.

15. The invention of claim 1 wherein said identification is a telephone number associated with said telecommunications line.

16. The invention of claim 1 wherein said pre-paid account is associated with at least two telecommunications lines.

17. A method for use in a switch within a telecommunications network, the method comprising
  a) receiving a request to set up a telecommunications call, said request including an identification of a telecommunications line from which said request originated, said identification having been made automatically by equipment within said telecommunications network, said request further including a destination telephone number for said call,
  b) thereafter determining if said call is to be billed to a pre-paid account,
  c) if said call is to be billed to a pre-paid account,
    i) communicating a first message to a pre-paid account database, said message including said telecommunications line identification,
    ii) receiving from said database, in response to said first message, a second message from which said telecommunications switch can determine a maximum allowed duration for said call,
    iii) causing said call to be routed through said switch to the destination telephone number without prompting the caller for the destination telephone number,
    iv) terminating said call while it is in progress if said maximum allowed duration is reached, and
    v) communicating a third message to said database when said call terminates, said third message indicating the actual duration of said call,
    vi) each of said messages being carried on a signaling network that is distinct from the network on which said call is carried, and d) if said call is not to be billed to a pre-paid account,
  i) causing said call to be routed through said switch to the destination telephone number.

18. The invention of claim 17 wherein said identification is a telephone number associated with said telecommunications line.

19. The invention of claim 18 wherein said signaling network is an SS7 network and said first, second and third messages conform to the SS7 protocol.

20. The invention of claim 19 wherein said second message includes information specifying said maximum allowed duration for said call.

21. The invention of claim 19 wherein the communicating of said first message is carried in response to said switch having determined that the cost of said call is to be charged to a pre-paid account maintained in said database.

22. A method for use in a switch within a telecommunications network, the method comprising
  a) receiving a request to set up a telecommunications call, said request including an identification of a telecommunications line from which said request originated, said identification having been made automatically by equipment within said telecommunications network, said request further including a destination telephone number for said call,
  b) thereafter exchanging messages with at least one database to determine whether the call should be charged to a pre-paid account registered to the identified telephone line,
  c) if it is determined that the call should be charged to such a pre-paid account,
    i) causing said call to be routed through said switch to the destination telephone number, and
    ii) causing said call to be billed to the pre-paid account, and
  d) if it is determined that such a pre-paid account is not registered,
    i) causing said call to be routed through said switch to the destination telephone number.

23. The invention of claim 22 wherein said identification is a telephone number associated with said telecommunications line.

24. The invention of claim 23 wherein said signaling network is an SS7 network and said first, second and third messages conform to the SS7 protocol.

25. The invention of claim 24 wherein said second message includes information specifying said maximum allowed duration for said call.

26. The invention of claim 24 wherein the communicating of said first message is carried in response to said switch having determined that the cost of said call is to be charged to a pre-paid account maintained in said database.

* * * * *